United States Patent
Lin et al.

(10) Patent No.: US 9,018,927 B2
(45) Date of Patent: Apr. 28, 2015

(54) PORTABLE ELECTRONIC APPARATUS AND POWER MANAGEMENT METHOD THEREOF

(71) Applicant: Wistron Corporation, New Taipei (TW)

(72) Inventors: Wei-Chih Lin, New Taipei (TW); Chih-Chuan Kung, New Taipei (TW)

(73) Assignee: Wistron Corporation, New Taipei (TW)

( * ) Notice: Subject to any disclaimer, the term of this patent is extended or adjusted under 35 U.S.C. 154(b) by 78 days.

(21) Appl. No.: 13/935,493

(22) Filed: Jul. 4, 2013

(65) Prior Publication Data

US 2014/0327425 A1   Nov. 6, 2014

(30) Foreign Application Priority Data

May 2, 2013   (TW) ............................. 102115718 U

(51) Int. Cl.
  *G05F 1/00*   (2006.01)
  *G05F 1/569*   (2006.01)
  *G05F 1/46*   (2006.01)

(52) U.S. Cl.
  CPC ....................................... *G05F 1/46* (2013.01)

(58) Field of Classification Search
  USPC .......................... 323/280, 282, 271, 276, 349
  See application file for complete search history.

(56) References Cited

U.S. PATENT DOCUMENTS

| | | | | |
|---|---|---|---|---|
| 4,924,169 | A   * | 5/1990  | Shifflet et al. | 320/112 |
| 6,337,563 | B2  * | 1/2002  | Takimoto et al. | 323/284 |
| 6,452,364 | B1  * | 9/2002  | Saeki et al. | 320/137 |
| 2004/0199800 | A1 * | 10/2004 | Yu et al. | 713/320 |
| 2007/0007822 | A1 * | 1/2007  | Cioaca et al. | 307/29 |
| 2008/0116848 | A1 * | 5/2008  | Chen | 320/112 |
| 2008/0130336 | A1 * | 6/2008  | Taguchi | 363/125 |
| 2012/0139345 | A1 * | 6/2012  | Ye et al. | 307/66 |
| 2012/0268063 | A1 * | 10/2012 | Qiu et al. | 320/107 |
| 2014/0032952 | A1 * | 1/2014  | KIM et al. | 713/323 |
| 2014/0225586 | A1 * | 8/2014  | Covi et al. | 323/299 |

* cited by examiner

*Primary Examiner* — Emily P Pham
(74) *Attorney, Agent, or Firm* — Jianq Chyun IP Office

(57) ABSTRACT

A portable electronic apparatus and a power management method are provided. The portable electronic apparatus includes a power manager and a controller. The power manager is used to receive a supply power generated by a power adapter. The power manager determines whether to generate a detecting signal by detecting whether a voltage value variation of the supply power is greater than a preset range. The power manager generates a current detecting value according to an input current provided by the supply power. The controller receives the detecting signal and the current detecting value, and generates an input current limit value according to a receiving status of the detecting signal and the current detecting value. The power manager controls the input current according to the input current limit value.

8 Claims, 5 Drawing Sheets

PORTABLE ELECTRONIC APPARATUS AND POWER MANAGEMENT METHOD THEREOF

CROSS-REFERENCE TO RELATED APPLICATION

This application claims the priority benefit of Taiwan application serial no. 102115718, filed on May 2, 2013. The entirety of the above-mentioned patent application is hereby incorporated by reference herein and made a part of this specification.

BACKGROUND OF THE INVENTION

1. Field of the Invention

The invention relates to a portable electronic apparatus, and more particularly to a power management method for a portable electronic apparatus.

2. Description of Related Art

Referring to FIG. 1, FIG. 1 is a block diagram illustrating a conventional portable electronic apparatus 120 and a power adapter 110 thereof. The portable electronic apparatus 120 includes a power manager 121, a controller 122 and a voltage division circuit constructed by resistors R1 and R2, and the power adapter 110 includes a voltage source VAC and a detecting circuit 111. When the power adapter 110 is connected to the portable electronic apparatus 120, the voltage source VAC provides an AC supply voltage to the power manager 121 of the portable electronic apparatus 120. The power manager 121 transmits a signal to notify the controller 122 about a connecting information of the portable electronic apparatus 120 and the power adapter 110. At the same time, the controller 122 can be informed of a type of the power adapter 110 by the voltage division circuit constructed by the resistors R1 and R2, or information provided by the detecting circuit 111. The controller 122 can also control the power manager 121 to limit an input current generated by the supply voltage according to the type of the power adapter 110 being informed, so as to avoid the power adapter 110 from generating an overload phenomenon.

In order to avoid the overload phenomenon in the conventional power adapter 110, hardware circuits are required to be additionally added in the power adapter 110 and its corresponding portable electronic apparatus 120. Therefore, additional costs are required in said convention technology which also reduces competitiveness of the product.

SUMMARY OF THE INVENTION

The invention relates to a portable electronic apparatus, which may prevent an overload phenomenon from occurring on a power adapter in a low-cost consideration.

The invention provides a power management method suitable for an electronic apparatus, which may effectively prevent an overload phenomenon from occurring on a power adapter.

The portable electronic apparatus of the invention includes a power manager and a controller. The power manager is used to couple a power adapter to receive a supply power generated by a power adapter. The power manager determines whether to generate a detecting signal or not by detecting whether a voltage value variation of the supply power is greater than a preset range or not. The power manager generates a current detecting value according to an input current provided by the supply power. The controller is coupled to the power manager to receive the detecting signal and the current detecting value, and the controller generates an input current limit value according to a receiving status of the detecting signal and the current detecting value. The input current limit value is configured to be supplied to the power manager, and the power manager controls the input current according to the limit current limit value.

The power management method of the invention is suitable for an electronic apparatus and includes steps of: receiving a supply power generated by a power adapter, and determining whether to generate a detecting signal by detecting whether a voltage value variation of the supply power is greater than a preset range; generating a current detecting value according to an input current provided by the supply power; receiving the detecting signal and the current detecting value, and generating an input current limit value according to a receiving status of the detecting signal and the current detecting value; and controlling the input current according to the input current limit value.

Based on above, the invention determines whether an overload phenomenon has occurred on a power adapter according to a generating status of the detecting signal generated by the power manager. When the overload condition has occurred on the power adapter, the input current provided by the power adapter at the time is calculated, and a new input current limit value is obtained based on the input current. Accordingly, the power manager may control the input current provided by the power adapter according to the input current limit value, so as to effectively prevent the overload phenomenon from occurring.

To make the above features and advantages of the invention more comprehensible, several embodiments accompanied with drawings are described in detail as follows.

DESCRIPTION OF THE EMBODIMENTS

Figure 1:
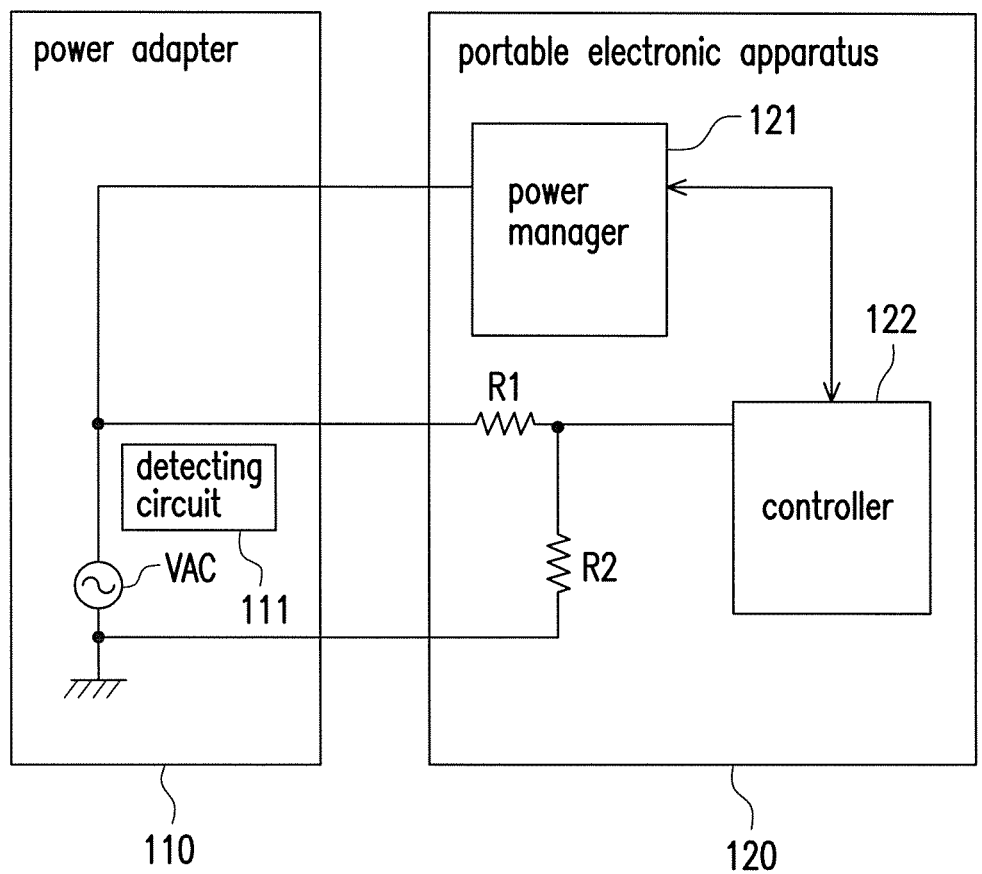
FIG. 1 is a block diagram illustrating a conventional portable electronic apparatus 120 and a power adapter 110 thereof.
Figure 2:
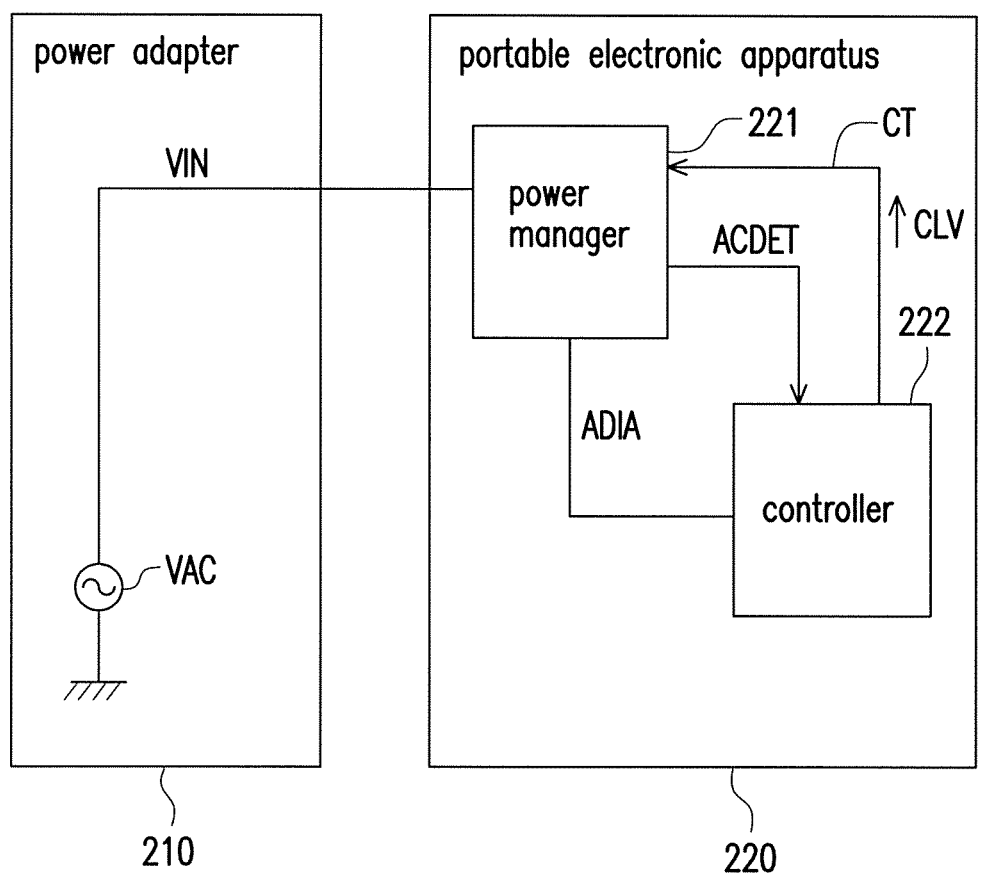
FIG. 2 is a block diagram illustrating a portable electronic apparatus 220 according to an embodiment of the invention.

Referring to FIG. 2, FIG. 2 is a block diagram illustrating a portable electronic apparatus 220 according to an embodiment of the invention. The portable electronic apparatus 220 is coupled to the power adapter 210 to receive a supply power VIN. The supply power VIN is an AC voltage generated by a voltage source VAC in the power adapter 210. The portable electronic apparatus 220 includes a power manager 221 and a controller 222.

The power manager 221 is coupled to the power adapter 210 to receive the supply power VIN, and the power manager 221 can determine whether to generate a detecting signal ACDET by detecting whether a voltage value variation of the supply power VIN is greater than a preset range. More specifically, the power manager 221 may timely detect whether the voltage value of the supply power VIN is decreased or not. When the voltage value of the supply power VIN is stable and greater than a preset threshold value, the power manager 221 generates the detecting signal ACDET and transmits the detecting signal ACDET to the controller 222. In contrast, when the voltage value of the supply power VIN is decreased to be lower than the preset threshold value, the power manager 221 stops to generate the detecting signal ACDET. It should be noted that, a reason why a voltage value variation of the supply power VIN occurs may be that the portable electronic apparatus 220 has drawn an excessive current from the supply power VIN generated by the power adapter 210, such that the power supply VIN generated by the power adapter 210 can not be maintained at its original voltage level. Briefly, it means that an overload phenomenon has occurred on the power adapter 210. Of course, the reason why the voltage value variation of the supply power VIN occurs may also be that the power adapter 210 has stopped to provide the supply power VIN to the portable electronic apparatus 220. In other words, the power adapter 210 is stopped, or a coupling relation between the power adapter 210 and the portable electronic apparatus 220 is released.

It should be noted that, when the overload phenomenon has occurred on the power adapter 210, the power manager 221 may stop to supply the detecting signal ACDET to the controller 222 due to decreasing of the voltage value of the supply power VIN. This phenomenon will not last, and once a consumed power of the portable electronic apparatus 220 decreases, the voltage value of the supply power VIN is then recovered back to its original voltage level. Accordingly, the power manager 221 can generate and provide the detecting signal ACDET to the controller 222 again.

In the present embodiment, the controller 222 may determine whether the overload phenomenon has occurred on the power adapter 210 by determining a number of times for receiving the detecting signal ACDET within a preset time interval. For instance, the controller 222 may determine whether the overload phenomenon has occurred or not on the power adapter 210 according to whether a number of times that the detecting signal ACDET appears and disappears is greater than the preset threshold value or not.

Moreover, when the controller 222 detects that the detecting signal ACDET is disappeared, and the detecting signal ACDET is continuously not received for a period of time, the controller 222 may determine that the power adapter 210 is no longer generating and providing the supply power VIN to the portable electronic apparatus 220. In other words, the power adapter 210 may have been removed.

Moreover, the power manager 221 may generate a current detecting value ADIA according to the input current provided by the supply power VIN and provide the current detecting value ADIA to the controller 222. The controller 222 may generate an input current limit value CLV according to the current detecting value ADIA when the overload phenomenon has occurred on the power adapter 210. The controller 222 then transmits the input current limit value CLV to the power manager 221, so that the power manager 221 may control the input current provided by the supply power VIN according to the received input current limit value CLV.

More specifically, when the overload phenomenon has occurred on the power adapter 210, the current detecting value ADIA indicates a current value of the input current provided by the supply power VIN at the time. In other words, the current detecting value ADIA is close to a maximum input current that can be provided by the power adapter 210. The controller 222 may perform a down-regulation on the current detecting value ADIA, so as to generate the input current limit value CLV. For example, the controller 222 may generate the input current limit value CLV by multiplying the current detecting value ADIA with a ratio value that is less than 1 (e.g., 95% or 90%). Accordingly, the power manager 221 may control the input current provided by the power adapter 210 according to the input current limit value CLV, so that it can be very safe and without the overload phenomenon.

Additionally, in an initial state, an original input current limit value is recorded in the power manager 221 of the portable electronic apparatus 220. When the portable electronic apparatus 220 connects the power adapter 210 for the first time, the power manager 221 may control the input current generated by the power adapter 210 according to the original input current limit value. When the overload phenomenon has occurred on the power adapter 210, the newly generated input current limit value CLV can be used to update the original input current limit value, and served as a basis for the power adapter 221 to control the input current generated by the power adapter 210.

In the present embodiment, the portable electronic device 220 further includes a communication line CT. The communication line CT is coupled between the power manager 221 and the controller 222. The controller 222 may transmit the input current limit value CLV to the power manager 221 through the communication line CT.

Figure 3:
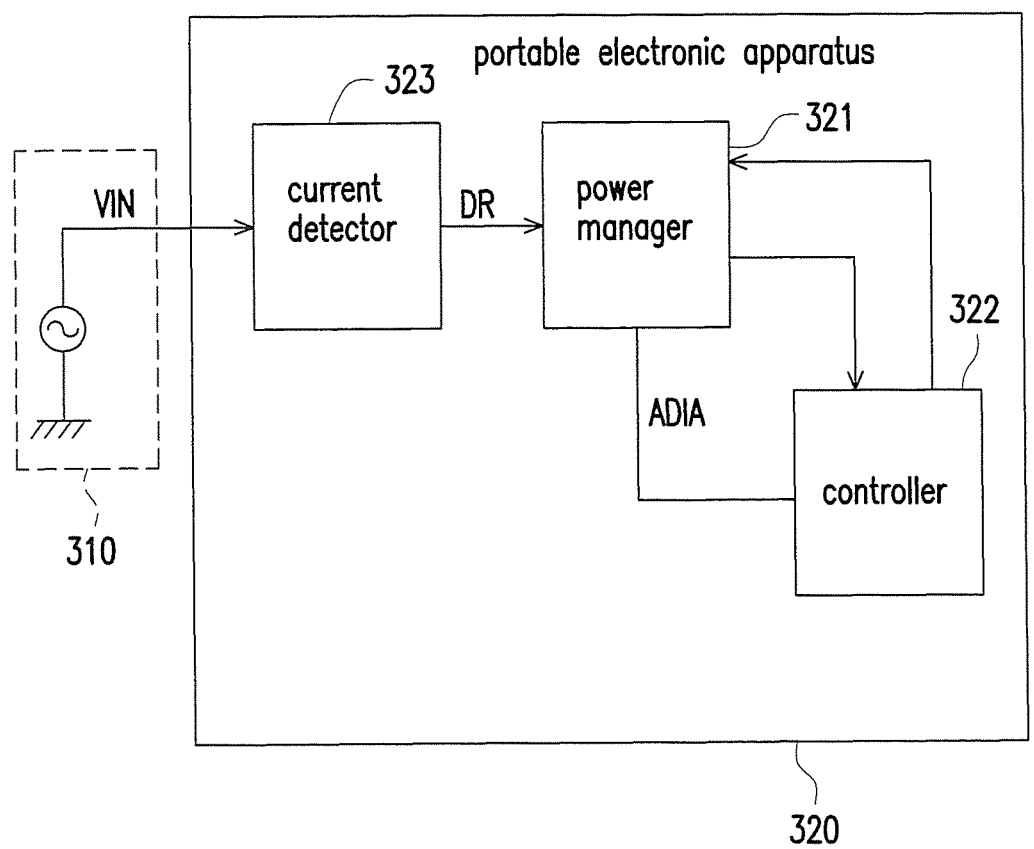
FIG. 3 is a block diagram illustrating a portable electronic apparatus 320 according to another embodiment of the invention.

Referring to FIG. 3, FIG. 3 is a block diagram illustrating a portable electronic apparatus 320 according to another embodiment of the invention. The portable electronic apparatus 320 includes a power manager 321, a controller 323 and a current detector 323. As a difference to the portable electronic apparatus 220 in the previous embodiment, the portable electronic apparatus 320 further includes the current detector 323. The current detector 323 is coupled between the power manager 321 and the power adapter 310. The power detector 323 receives the input current provided by the supply voltage VIN, and generates a detecting result DR according to the input current provided by the supply voltage VIN. The detecting result DR is provided to the power manager 321. The power manager 321 can receive the detecting result DR, and generate the current detecting value ADIA by amplifying the detecting result DR by N times (N is greater than or equal to 1).

Figure 4:
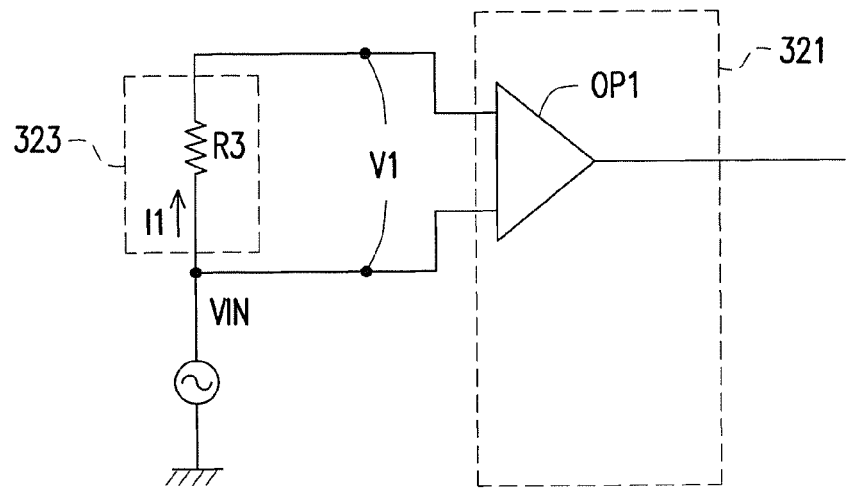
FIG. 4 is a schematic view illustrating a power manager 321 and a current detector 323 according to an embodiment of the invention.

Referring to FIG. 4, FIG. 4 is a schematic view illustrating a power manager 321 and a current detector 323 according to an embodiment of the invention. Herein, the current detector 323 is a resistor R3. The resistor R3 receives the supply power VIN so as to receive an input current I1. The input current I1 passes through the resistor R3 and generates a voltage difference V1 (i.e., the detecting result DR) between two terminals of the resistor R3, in which $V1=I1 \times R3$. The power manager 321 includes an amplifier OP1, and the amplifier OP1 has two input terminals coupled to the two terminals of the resistor R3, respectively. An input terminal of the amplifier OP1 amplifies the voltage difference V1 and generates the current detecting value ADIA. Therein, the current detecting value can be expresses as $ADIA=A \times V1=A \times I1 \times R3$. A is a gain of the amplifier OP1.

An output power W of the power adapter 310 can be deduced from above description, in which $W=I1 \times VIN=(V1/R3) \times VIN=VIN \times ((ADIA/A)/R3)$.

Figure 5:
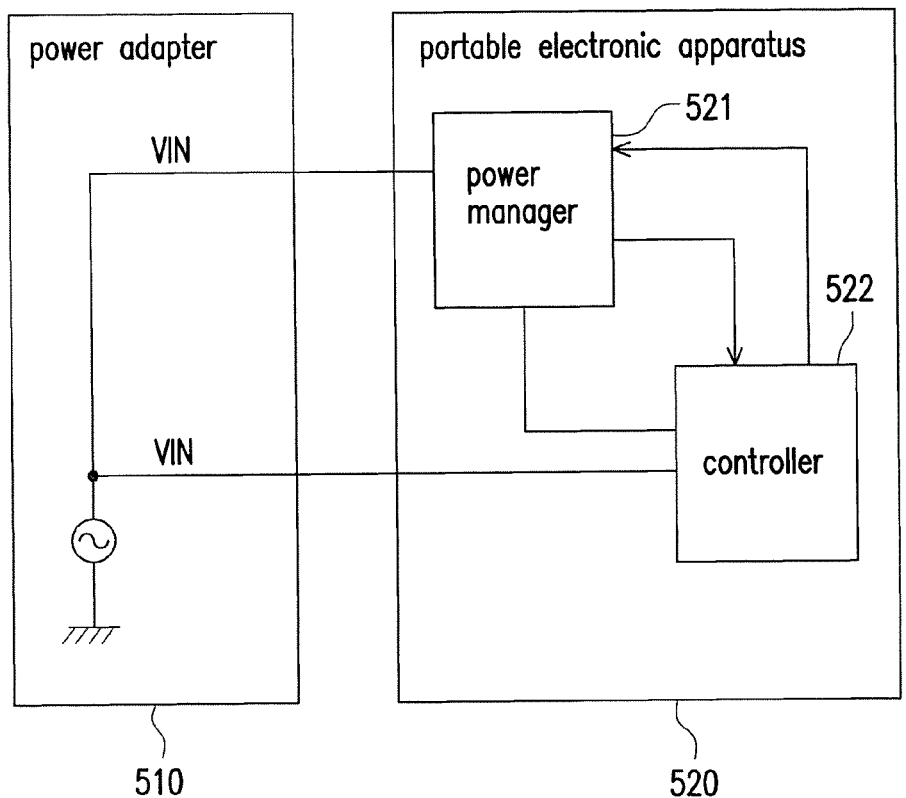
FIG. 5 is a block diagram illustrating a portable electronic apparatus 520 according to yet another embodiment of the invention.

Referring to FIG. 5 below, FIG. 5 is a block diagram illustrating a portable electronic apparatus 520 according to yet another embodiment of the invention. The portable electronic apparatus 520 includes a power manager 521 and a controller 522, and the portable electronic apparatus 520 is coupled to the power adapter 510 to receive the supply power VIN. As a difference to the previous embodiment, the controller 522 is directly connected to the power adapter 510 to receive the supply power VIN. In the present embodiment, the controller 522 can further determine a coupling status between the portable electronic apparatus 510 and the power adapter 520 directly according to a supplying status of of the supply power VIN.

Figure 6:
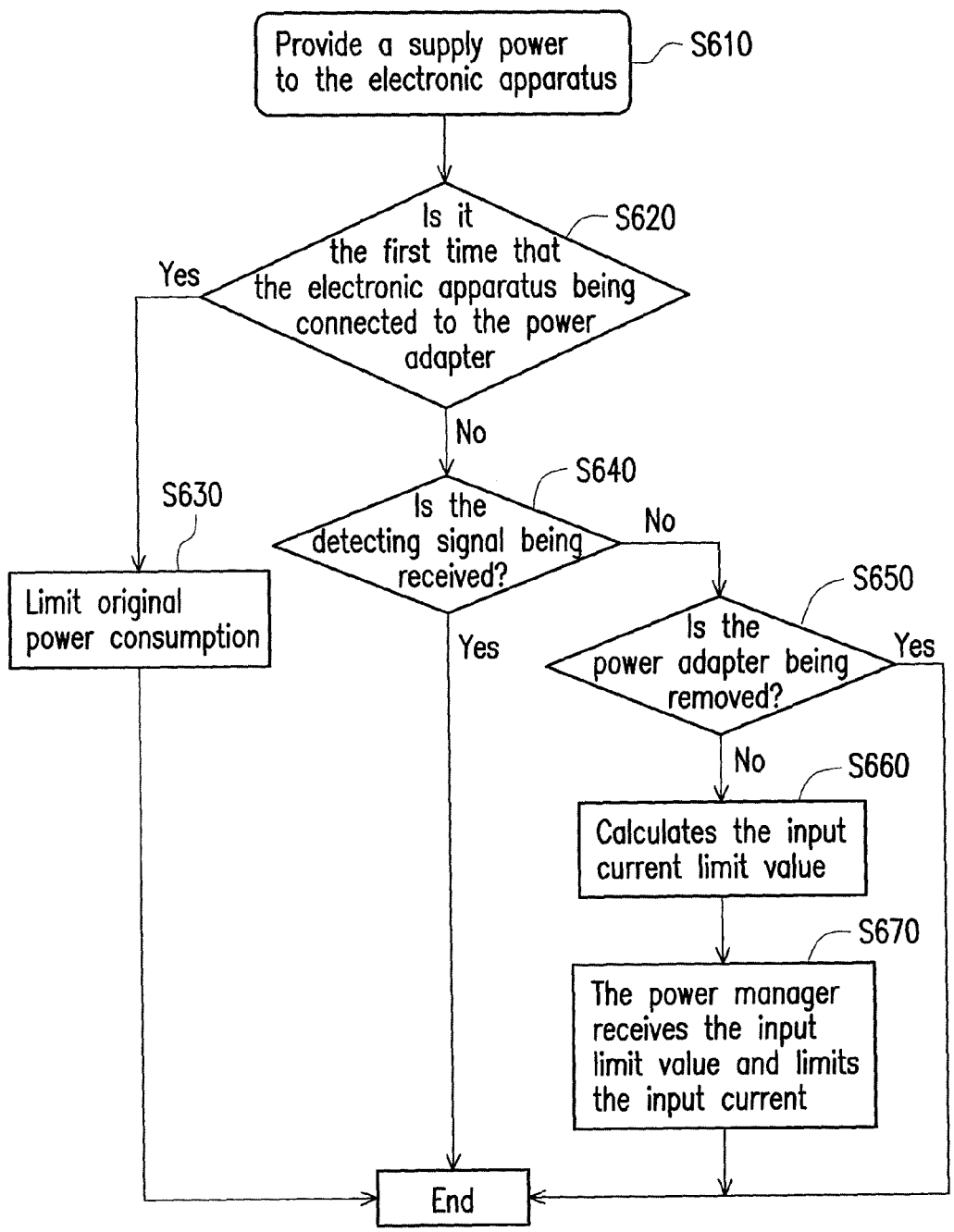
FIG. 6 is a flowchart illustrating a power management method according to an embodiment of the invention.

Referring to FIG. 6, FIG. 6 is a flowchart illustrating a power management method according to an embodiment of the invention. In step S610, the power adapter is connected to the electronic apparatus and started to provide a supply power to the electronic apparatus. In step S620, it is determined whether the electronic apparatus is connected to the power adapter for the first time, and if a result to such determination is positive, a limitation to a power consumption of the electronic apparatus is performed according to an original input current limit value (step S630). If the result to the determination in step S620 is negative, step S640 is performed to determine whether a detecting signal is continuously received. If the detecting signal is continuously received in step S640, this indicates that the overload phenomenon does not occur, so that the power adapter may operate normally.

In contrast, if the detecting signal is continuously not received in step S640, step S650 is then executed to determine whether the power adapter is removed. If it is confirmed that the power adapter has been removed, the entire process is ended. On the contrary, if the power adapter is not removed, this indicates that the overload phenomenon has occurred on the power adapter, and step S660 is executed to calculate an input current limit value. Subsequently, the power manager receives the calculated input current limit value. The power manager then limits a size of the input current according to the input current limit value (step S670).

Relevant implementation detail in the present embodiment has been described in the previous embodiments and implementations, thus it is omitted hereinafter.

In view of above, the invention utilizes the controller to detect a generating status of the detecting signal provided by the power manager, so as determine whether the overload phenomenon has occurred on the power adapter. When the overload phenomenon has occurred, the input current supplied by the power adapter is calculated and then the input current limit value is obtained through the input current. By utilizing the input current limit value as the basis for the power manger to control power consumption of the portable electronic apparatus, the overload phenomenon of the power adapter may be effectively prevented from occurring, so as to ensure safety of the product. In addition, the invention can be effectively implemented by using a simple hardware arrangement together with corresponding software and firmware, it does not require significant costs on the hardware.

What is claimed is:

1. A portable electronic apparatus, comprising:
   a power manager configured to couple a power adapter to receive a supply power generated by the power adapter, the power manager determining whether to generate a detecting signal or not by detecting whether a voltage value variation of the supply power is greater than a preset range or not, and the power manager generating a current detecting value according to an input current provided by the supply power; and
   a controller coupled to the power manager, receiving the detecting signal and the current detecting value, and generating an input current limit value according to a receiving status of the detecting signal and the current detecting value,
   wherein, the input current limit value is configured to be supplied to the power manager, and the power manager controls the input current according to the input current limit value,
   wherein the controller determines that an overload phenomenon has occurred on the power adapter when the controller determines that a number of times for not receiving the detecting signal within a time interval is greater than a preset threshold value, and the controller determines that a coupling status between the power adapter and the portable electronic apparatus is released when the controller determines that the detecting signal is continuously not received within the time interval.

2. The portable electronic apparatus according to claim 1, further comprising:
   a communication line coupled between the power manager and the controller, the controller transmitting the input cu r rent limit value to the power manager through the communication line.

3. The portable electronic apparatus according to claim 1, further comprising:
   a current detector coupled between the power adapter and the power manager, the current detector receiving the input current and generating a detecting result according to the input current,
   wherein, the power manager receives the detecting result, and generates the current detecting value by amplifying the detecting result.

4. The portable electronic apparatus according to claim 3, wherein the power manager comprises:
   an amplifier coupled to the current detector, the amplifier receives the detecting result and generates the current detecting value by amplifying the detecting result.

5. The portable electronic apparatus according to claim 1, wherein the power adapter generates the input current limit value according to the current detecting value when the overload phenomenon has occurred on the power adapter.

6. The portable electronic apparatus according to claim 1, wherein the controller is further coupled to the power adapter to receive the supply power, and the controller determines a coupling status between the portable electronic apparatus and the power adapter according to a supplying status of the supply power.

7. A power management method for an electronic apparatus, comprising:
   receiving a supply power generated by a power adapter, and determining whether to generate a detecting signal by detecting whether a voltage value variation of the supply power is greater than a preset range;
   generating a current detecting value according to an input current provided by the supply power;
   receiving the detecting signal and the current detecting value, and generating an input current limit value according to a receiving status of the detecting signal and the current detecting value; and
   controlling the input current according to the input current limit value,
   wherein the step of receiving the detecting signal and the current detecting value, and generating the input current limit value according to the receiving status of the detecting signal and the current detecting value comprising:
   determining that an overload phenomenon has occurred on the power adapter when a number of times for not receiving the detecting signal within a time interval is greater than a preset threshold value;

determining that a coupling status between the power adapter and the portable electronic apparatus is released when the detecting signal is continuously not received within the time interval; and generating the input current limit value according to the current detecting value when the overload phenomenon has occurred on the power adapter.

8. The power management method according to claim 7, wherein the step of generating the current detecting value according to the input current provided by the supply power comprising:

generating a detecting result by detecting the input current; and generating the current detecting value by amplifying the detecting result.

* * * * *